United States Patent Office 2,869,987
Patented Jan. 20, 1959

2,869,987

ACTIVATION OF LIME

Hans Horn, Evanston, Ill., assignor to International Minerals & Chemical Corporation, a corporation of New York No Drawing. Application November 15, 1955
Serial No. 547,036

2 Claims. (Cl. 23—186)

This invention concerns the preparation of alkaline earth hypochlorites, and more particularly, activation of alkaline earth hydroxides for the preparation of the corresponding hypochlorites.

Conventionally, calcium hypochlorite is prepared by chlorinating an aqueous suspension of calcium hydroxide, but it is well known that not all calcium hydroxide suspensions are suitable for this purpose. For example, dry by-product lime from various sources, such as, for example, acetylene generators, is substantially unreactive chemically and does not react with chlorine under ordinary chlorination conditions to produce any substantial amount of calcium hypochlorite. The inactivity of this by-product lime has long been recognized, as indicated by Ullmann, Enzyklopaedie de Technischen Chemie, vol. 5, p. 514, who states that by-product lime from acetylene production cannot be used for production of bleach solution.

High grade calcium hydroxide is relatively expensive, while by-product hydrated lime from acetylene generators is available at small cost. There has been a need for a simple method for activating by-product lime so that it could be chlorinated to calcium hypochlorite in high yields.

It is an object of this invention to provide a process for activating chemically inactive alkaline earth metal hydroxides.

Another object of this invention is to activate dry by-product lime from acetylene generators so that the lime can be chlorinated to produce calcium hypochlorite by conventional chlorination procedures.

Another object of this invention is to treat by-product lime from acetylene generators by a simple commercially feasible procedure to render it sufficiently chemically active so that it will react quantitatively with chlorine to produce calcium hypochlorite.

A further object of this invention is to provide a process for producing calcium hypochlorite from by-product lime from acetylene generators.

A further object of this invention is to provide a process whereby substantially all calcium hydroxide in by-product lime from acetylene generators is converted to calcium hypochlorite.

In accordance with this invention, an alkaline earth metal hydroxide, that is, calcium hydroxide, barium hydroxide or strontium hydroxide and magnesium hydroxide, which is substantially unreactive chemically and which is particularly unreactive toward chlorine is rendered substantially reactive chemically by treatment in accordance with a very simple procedure. According to a specific embodiment of this invention, calcium hydroxide which is unreactive chemically is converted to a highly reactive calcium hydroxide. Inactive calcium hydroxide, and preferably calcium hydroxide obtained from production of acetylene by treating calcium carbide with water or steam, which calcium hydroxide is substantially unreactive toward chlorine under conventional chlorination conditions, after vigorous agitation in an aqueous slurry in accordance with this invention reacts quantitatively with chlorine under conventional chlorination conditions to produce calcium hypochlorite. Inactive by-product lime from acetylene generators is completely activated by agitating a slurry of this lime vigorously at room temperature. Although it is not known what transformation takes place in the lime during the agitation period, it is observed that by-product lime which is substantially unreactive toward chlorine prior to agitation is after a short period of agitation rendered completely reactive and will react quantitatively with chlorine to form calcium hypochlorite.

While it is preferred that the procedure of this invention be carried out at room temperatures for convenience and economy, either higher or lower temperatures may be utilized, if desired. As the temperature is increased the period of agitation can be correspondingly decreased to attain the same degree of activation. There is no advantage in using temperatures higher or lower than atmospheric temperature unless time is an important factor, and if agitation is sufficiently vigorous, complete activation of the lime is achieved in about two minutes at room temperature, thereby removing the advantage in using higher temperatures.

The time necessary to completely activate by-product lime is dependent both on the temperature utilized and on the vigor of the agitation employed. With feeble agitation, extended periods of reaction may be necessary. Desirably, the minimum degree of agitation utilized will be at least as vigorous as that attained by refluxing a 20% solution of hydrated lime at atmospheric pressure, and preferably the agitation will be as vigorous as the equipment at hand will permit. Agitation may be provided by manually shaking a vessel containing a slurry of inactive lime or by passing live steam through the slurry or utilizing any conventional blender, homogenizer, paddle-type mixer or similar equipment. Agitation which provides a shearing action is preferred. By utilizing a blender such as the well known Waring Blendor, a 10% slurry of inactive by-product lime can be completely activated in a period as short as about two minutes. Completeness of the activation can be readily determined by passing chlorine through a sample of the reaction product mixture and then determining the available chlorine in the treated slurry. The reaction between chlorine and the lime should be quantitative if activation is complete.

Chemically inactive lime or hydrated lime which may be completely activated in accordance with this invention may be obtained from any source but by-product lime from acetylene generators is preferred due to its availability and cheapness and because it is completely activated readily by this process. Waste lime from acetylene generators, wherein calcium carbide is reacted with water or steam to produce acetylene, is available in the form of a dry powder having the following approximate composition:

| | Percent |
|---|---|
| $Ca(OH)_2$ | 91.7 |
| $SiO_2$ | 1.89 |
| $Fe_2O_3$ | .30 |
| Carbon | .30 |
| $Al_2O_3$ | 1.46 |
| MgO | .35 |
| SiC | 0.19 |
| Heavy metals (Pb) | 0.005 |
| $CO_2$ | 3.31 |
| $H_2O$ | 0.50 |

For the purposes of this invention chemically inactive lime is desirably admixed with water to form an aqueous slurry containing between about 5% and about 30% solids by weight. Preferably the slurry will contain between about 8% and about 12% solids by weight.

In accordance with a preferred embodiment of this invention, dry by-product lime from an acetylene generator is mixed with sufficient water to form a 20% slurry and agitated at room temperature in a Waring Blendor for about two minutes. The agitated by-product lime slurry is diluted with sufficient water to produce a mixture containing about 10% solids by weight and then chlorinated by passing chlorine gas through the mixture in a maximum amount of 1.1 grams per gram of calcium oxide in the slurry, preferably 1 gram of chlorine per gram of calcium oxide. The temperature during the chlorination reaction is kept below about 40° C. and the pH of the solution is maintained above about 9.0. Analysis of the reaction product mixture for available chlorine indicates that the lime reacts quantitatively with the chlorine.

The following examples illustrate specific embodiments of this invention. All parts and percentages are by weight unless otherwise indicated.

EXAMPLES I, II, III

Dry by-product lime from an acetylene generator and having an approximate analysis as shown above was slurried with water and agitated at room temperature. The quantities of lime and water and the conditions of agitation are indicated in Table 1. Following agitation, the reaction product mixture was chlorinated by passing chlorine gas through the mixture. The quantity of chlorine gas utilized and the period over which it was added is shown in Table 1. In each case the pH of the reaction product mixture during chlorination was maintained above about 9.0. Following chlorination, the reaction product mixture was analyzed to determine the available chlorine present and in each instance it was found that the reaction between the lime and chlorine was substantially quantitative. Table 1 shows the results obtained by chlorinating by-product lime from an acetylene generator without first agitating the by-product lime to activate it. Table 1 shows that whereas vigorously agitated by-product lime slurry will combine quantitatively with chlorine, by-product lime which has not been agitated vigorously is almost completely unreactive toward chlorine as shown by the available chlorine content of the reaction product mixture.

Table 1

| Ex. | Ca(OH)$_2$, grams | Activation Treatment | Cl$_2$ Added, grams | Addn. Time, Min. | Available Chlorine, g./l. | Total Volume Lime Slurry, ml. |
|---|---|---|---|---|---|---|
| I | 50 | Shake violently by hand every 5 min. for 30 sec. for 40 minutes. | 31 | 11 | 59.9 | 500 |
| II | 50 | Mix in Waring Blendor for 2 minutes | 30 | 8 | 60.3 | 500 |
| III | 100 | Mix with paddle stirrer mixer 10 minutes | 60 | 10 | 59.0 | 1,000 |
| Control | 200 | Agitation with air during chlorination only. | 110 | 25 | 2.4 | 1,000 |

Having now fully described and illustrated the character of the instant invention, what is desired to be secured by Letters Patent is:

1. A process for treating dry by-product lime obtained by reacting calcium carbide with water to produce acetylene and drying the lime resulting therefrom, said dry by-product lime being substantially unreactive with chlorine when treated therewith in aqueous suspension, which comprises commingling said dry by-product lime with a slurrying and activating medium consisting of water to a solids content between about 5 and about 30% by weight and vigorously agitating the resulting slurry for a period of at least about two minutes, whereby said lime is rendered highly reactive toward chlorine.

2. A process as in claim 1 wherein said slurry contains between about 8 and about 12% by weight of solids.

References Cited in the file of this patent

UNITED STATES PATENTS

| | | |
|---|---|---|
| 326,066 | Strype | Sept. 8, 1885 |
| 1,904,946 | Kippe | Apr. 18, 1933 |
| 1,916,592 | Weibezahn | July 4, 1933 |
| 2,055,773 | Radcliffe | Sept. 29, 1936 |
| 2,061,332 | Rue et al. | Nov. 17, 1936 |
| 2,122,889 | Mues | July 5, 1938 |
| 2,213,131 | Wintersberger et al. | Aug. 27, 1940 |
| 2,320,635 | Mericola et al. | June 1, 1943 |
| 2,535,227 | Ott | Dec. 26, 1950 |
| 2,560,016 | Walker | July 10, 1951 |
| 2,611,683 | Knibbs | Sept. 23, 1952 |
| 2,701,188 | Ritter et al. | Feb. 1, 1955 |